(12) United States Patent
Zhu et al.

(10) Patent No.: US 12,072,262 B2
(45) Date of Patent: Aug. 27, 2024

(54) AUTOMATIC DRIVING ACCELERATION TEST METHOD CONSIDERING EFFICIENCY AND COVERAGE

(71) Applicant: Jilin University, Changchun (CN)

(72) Inventors: Bing Zhu, Changchun (CN); Peixing Zhang, Changchun (CN); Jian Zhao, Changchun (CN); Yuhang Sun, Changchun (CN); Tianxin Fan, Changchun (CN)

( * ) Notice: Subject to any disclaimer, the term of this patent is extended or adjusted under 35 U.S.C. 154(b) by 210 days.

(21) Appl. No.: 17/901,879

(22) Filed: Sep. 2, 2022

(65) Prior Publication Data

US 2022/0412843 A1 Dec. 29, 2022

(30) Foreign Application Priority Data

Nov. 24, 2021 (CN) .......................... 202111398403.2

(51) Int. Cl.
*G01M 17/007* (2006.01)
*B60W 50/04* (2006.01)
*B60W 60/00* (2020.01)

(52) U.S. Cl.
CPC ...... *G01M 17/0078* (2013.01); *B60W 50/045* (2013.01); *B60W 60/001* (2020.02); *B60W 2520/105* (2013.01)

(58) Field of Classification Search
CPC .......... G01M 17/0078; G01M 17/007; B60W 50/045; B60W 60/001; B60W 2520/105; B60W 40/10; B60W 60/0023; G06F 11/3457; G06F 11/3676; G06F 16/25; G06F 17/16; G06F 17/18
See application file for complete search history.

(56) References Cited

U.S. PATENT DOCUMENTS

| 11,565,709 B1* | 1/2023 | Caldwell ................ G06N 3/088 |
| 2018/0266920 A1 | 9/2018 | Kim |
| 2020/0143408 A1 | 5/2020 | Sawai |
| 2021/0044999 A1 | 2/2021 | Chen et al. |
| 2023/0037142 A1* | 2/2023 | Nayhouse ............ G05D 1/0088 |
| 2023/0070734 A1* | 3/2023 | Nayhouse ........... B60W 60/001 |

* cited by examiner

*Primary Examiner* — Richard M Camby
(74) *Attorney, Agent, or Firm* — Zhigang Ma

(57) ABSTRACT

The disclosure belongs to the technical field of autonomous vehicle, in particular to an automatic driving acceleration test method considering efficiency and coverage, which includes the following steps. Step 1 is definition of scenario test priority. Step 2 is zone division. Step 3 is search within zones. Step 4 is update of scenario test priorities. Step 5 is iterative test. After selecting the automatic driving function to be tested and setting the parameters of the vehicle operation zone, the scenario generation range is formed. The coverage of the test scenario is improved by dividing the generated range and setting the freedom of early autonomous driving exploration. The efficiency of the test process is improved by continuously improving the probability of generating dangerous scenarios in the test process. Thus, it is ensured that the generated test scenarios take into account both test efficiency and test coverage.

7 Claims, 3 Drawing Sheets

AUTOMATIC DRIVING ACCELERATION TEST METHOD CONSIDERING EFFICIENCY AND COVERAGE

CROSS REFERENCE TO RELATED APPLICATION

This patent application claims the benefit and priority of Chinese Patent Application No. 202111398403.2 filed on Nov. 24, 2021, the disclosure of which is incorporated by reference herein in its entirety as part of the present application.

TECHNICAL FIELD

The present disclosure relates to the technical field of autonomous vehicle, and more specifically, to an automatic driving acceleration test method considering efficiency and coverage.

BACKGROUND ART

Although some enterprises have launched autonomous vehicles, the problem of how to ensure the safety of autonomous vehicles on the road has not been solved. Due to the complex operation scenarios of autonomous vehicles, the field test has high cost, low efficiency and poor safety, and the simulation test has become an important means in the safety verification process of autonomous vehicle. In the process of simulation test, the generation of test scenarios is mostly based on the parameter settings of the vehicle design and operation zone. However, the parameters designed in the vehicle operation zone still contain a large number of safety scenario. If all these scenarios are extracted and tested, it will still waste computing power and improve the test cost to a great extent.

The existing test methods mainly consider the test efficiency, and less consider the coverage of scenario generation in the test process.

SUMMARY

The disclosure provides an automatic driving acceleration test method considering efficiency and coverage. After selecting the automatic driving function to be tested and setting the parameters of the vehicle operation zone, the scenario generation range is formed. The coverage of the test scenario is improved by dividing the generated range and setting the freedom of early autonomous driving exploration. The efficiency of the test process is improved by continuously improving the probability of generating dangerous scenarios in the test process. Thus, it is ensured that the generated test scenarios take into account both test efficiency and test coverage, and the above problems existing in the existing test methods are solved.

The technical scheme of the disclosure is described below in combination with the accompanying drawings.

The automatic driving acceleration test method considering efficiency and coverage includes the following steps.

Step 1: definition of scenario test priority.

scenario hazard, scenario exposure frequency and scenario sensitivity of different specific test scenarios are determined according to natural driving data, and then a test priority $w_i$ corresponding to a specific test scenario is calculated.

Step 2: zone division.

A scenario generation range parameter space is divided according to the test priority $w_i$ of the specific test scenario, and the specific test scenarios with similar test priorities are divided together.

Step 3: search within zones.

Specific test scenarios are selected from all the divided zones in turn, then a set to be tested in this round is formed, and a tested autopilot algorithm is tested by the specific test scenarios in the set to be tested to obtain a result.

Step 4: update of scenario test priorities.

Actual scenario hazards of the selected scenarios in each zone in the obtained test result are compared with scenario hazards at a location of the specific test scenario parameters obtained by the natural driving data, and the test priority of the specific test scenario corresponding to the tested algorithm in the scenario generation parameter space is updated.

Step 5: iterative test.

The steps 2, 3 and 4 are repeated until the test priorities of all specific test scenarios remaining in the scenario generation range is lower than a set threshold.

The specific method of the step 1 is as follows.

11) The scenario test priority is determined by the scenario hazard, scenario exposure frequency and scenario sensitivity of the test scenario.

12) The scenario hazard is divided based on a risk level during the test, and the scenario is divided into a collision scenario and a non-collision scenario. The collision scenario is subdivided into severe collision, general collision and minor collision according to a maximum acceleration of the collision process. The non-collision scenario is divided into close-collision and safety scenario according to a maximum $TTC^{-1}$ during the test, that is, a reciprocal of collision time. The definition of $TTC^{-1}$ is shown in formula (1). The hazard is normalized to define the scenario hazard $h_i$, wherein i is a specific scenario location, $h_i$ is 1.0 for the severe collision, $h_i$ is 0.8 for the general collision, $h_i$ is 0.6 for the minor collision, $h_i$ is 0.4 for the close-collision, and $h_i$ is 0.2 for the safety scenario.

$$TTC^{-1} = \frac{\Delta v}{\Delta dis} \tag{1}$$

Wherein, $\Delta dis$ is a vehicle spacing between the front and rear vehicles, and $\Delta v$ is a relative speed between the front and rear two vehicles.

$0.7\ s^{-1}$ is taken as a $TTC^{-1}$ boundary of the close-collision and the safety scenario, that is, for $TTC_{max}^{-1} \geq 0.7$, it is identified as the close-collision state, $h_i=0.4$; and for $TTC_{max}^{-1} < 0.7$, it is identified as the safety scenario, $h_i=0.2$.

13) The exposure frequency of the scenario is described by Gaussian model, as shown in formula (2).

$$p_i = \frac{1}{(2\pi)^{\frac{d}{2}} |\Sigma|^{\frac{1}{2}}} \exp\left[-\frac{1}{2}(X-\mu)^T \Sigma^{-1} (X-\mu)\right] \tag{2}$$

Wherein, d is a parameter dimension, $\Sigma$ is a covariance matrix describing a correlation of various types of parameters, $\mu$ is a mean vector of each parameter variable, and X is a specific scenario parameter vector.

14) The scenario sensitivity refers to a collision uncertainty of the specific scenario, that is, dangerous zones and safety zones in the logical scenario parameter space are divided according to an existing database data. The closer a point is to a boundary of the dangerous space and safety space, the greater the collision uncertainty of this point, as shown in formula (3) and (4).

$$d_i = \sqrt{(x_1 - x'_1)^2 + (x_2 - x'_2)^2 + \cdots + (x_n - x'_n)^2} \quad (3)$$

$$U_{di} = \begin{cases} \dfrac{d_{out} - d_i}{d_{out}}, & i \notin safetyzone \quad d_i < d_{out} \\ \dfrac{d_{in} - d_i}{d_{in}}, & i \in safetyzone \quad d_i < d_{in} \\ 0.01, & \text{others} \end{cases} \quad (4)$$

Wherein, x is a calculated specific scenario parameter, x' is a closest point parameter between the dangerous boundary and the specific scenario parameter point, subscript n is a dimension of scenario elements, i is a location of the specific scenario, $U_{di}$ is the scenario sensitivity of the specific scenario, safetyzone is the safety zone space in the logical scenario parameter space, $d_i$ is a nearest distance between the specific scenario and the dangerous boundary, that is, the distance between x and x'.

A length of Euclidean distance between two points composed of an upper limit and a lower limit of all dimensions in the parameter space is taken as a space length, the nearest distance $d_{out}$ between the boundary point of the parameter space in the collision zone and the boundary line is a standardized reference value of the collision zone, and the rest $d_{in}$ of the space length is the standardized reference value of the safety zone.

15) Combined with the obtained specific scenario hazard $h_i$, scenario exposure frequency $p_i$ and scenario sensitivity $U_{di}$, the concept of scenario test priority is proposed, which represents an importance weight of the specific scenario, that is, a value of testing the specific scenario. A calculation method of the scenario test priority is shown in formula (5).

$$w_i = U_{di} \cdot p_i \cdot h_i \quad (5)$$

The specific method of step 2 is as follows.
21) Firstly, a specific scenario parameter position with the highest test priority in the parameter space is selected as a zone center of the first small zone.
22) Secondly, locations of the adjacent specific scenario parameters are explored in all directions around the specific scenario parameter point with the highest test priority, and the specific scenario with the highest test priority in the zone is divided into the first small zone.
23) Finally, the first small zone is taken as a new zone center and it is continued to explore surroundings of the first small zone.

After the end of each exploration in steps 22) and 23), an average test priority of all specific scenarios in the current zone is calculated. When the average test priority reaches a set threshold, the division ends, and it is necessary to reselect the scenario parameter position with the highest test priority from the remaining specific scenarios in the parameter space as a zone center of the next zone. In a late stage of zone division, because the test priority of the remaining specific scenarios in the parameter space is small, it is necessary to limit a maximum value of the number of scenarios in the zone, and the exploration should be stopped even if the average test priority does not reach the set threshold. In addition, a minimum value of the number of specific scenarios in the zone is set. When the parameter space cannot be further divided, missing specific scenario parameters that are located at the edge of the parameter space or do not meet the requirements of zone division are sorted out and assigned to an adjacent zone with a closest average test priority.

The specific method of step 3 is as follows.
31) When all the specific scenarios have found the zone to which they belong, the specific scenarios are selected from all the divided zones in turn to form the set to be tested in this round, and a black box autopilot algorithm is automatically tested by the specific scenarios in the set to be tested and the result is obtained, that is, the scenario hazard obtained by the test of the autopilot algorithm in the specific scenarios is obtained.
32) For the zone where a zone average test priority of the zone is greater than the specified threshold, the specific scenario parameters with the highest test priority and not participating in the test are selected for the test. For the zone where a zone average test priority is less than the threshold, the specific scenarios that do not participate in the test are randomly selected for the test.

The specific method of step 4 is as follows.
41) The actual scenario hazard of the selected scenarios in each zone in the test result obtained in the step 3 is compared with scenario hazard at the corresponding specific scenario parameter location in a prior data, and the specific scenario test priority corresponding to the tested algorithm in the scenario generation parameter space is updated.

If the scenario hazard in the test result is the same as the corresponding scenario hazard in the prior data, the test priority of the specific scenario corresponding to the tested algorithm will not change. If the test result is different from the prior data result, the scenario hazards and scenario sensitivities of the specific scenario and surrounding specific scenarios are changed according to formula (6) and (7), so that further the test priorities of the specific scenario and surrounding specific scenarios are changed. When updating the scenario hazard, if the actual scenario hazard obtained from the specific scenario test result is higher than the prior data, the initial $h_i$ is changed to the actual scenario hazard $h_{if}$ corresponding to the test result. On the contrary, a root mean square of the hazards of the test result and database data is taken as the updated scenario hazard $h'_i$, as shown in formula (6).

$$h'_i = \frac{\sqrt{h_{if}^2 + h_i^2}}{2} \quad (6)$$

42) When updating the sensitivity of specific scenario, a concept of sensitive field change is introduced, that is, after finding out the specific scenario location in this round of test result that are inconsistent with the database data, and the specific scenario location in this round of test result that are inconsistent with the database data is regarded as a center point of field change, and a formula causing the field change of surrounding points is:

$$U'_{dif\_k} = \begin{cases} \min\left[\dfrac{1}{2}\eta\left(\dfrac{1}{d(q_k, q_{dif\_n})} - \dfrac{1}{d^*}\right)^2, o\right], & d(q_k, q_{dif\_n}) \leq d^* \\ 0, & d(q_k, q_{dif\_n}) > d^* \end{cases} \quad (7)$$

-continued $$U_{dif} = \min\left(\sum U'_{dif}, o\right) \quad (8)$$

Wherein, $U_{dif}'$ is a field change value of the n-th change point received by the specific scenario at the point k, $U_{dif}$ is a field change value of all change points received at point k, $d(q_k,q_{dif\_n})$ is a distance between the point k and the n-th change point, d* is a distance influence threshold, η is an adjustment parameter, and o is a set threshold.

When the test result of the specific scenario and the scenario hazard of the database data belong to the two kinds of states of minor collision and close-collision respectively, the distance influence threshold and adjustment parameters of the two kinds of minor collision and close-collision are twice the changes of other types.

After completing the calculation of the field changes at all locations, the updated test priority of the specific scenario is:

$$w_i' = \min[(U_{di} + U_{dif}) \cdot p_i \cdot h_i', X] \quad (9)$$

Wherein, $w_i'$ is the updated scenario test priority, and X is an upper limit of the set scenario test priority.

The specific method of step 5 is as follows.

Steps 2, 3 and 4 are repeated until the test priority of the remaining test scenarios within the scenario generation range is lower than the set parameter threshold. And at this time, the iteration is terminated, and the test result is output for a subsequent performance evaluation of the tested autonomous vehicle.

The beneficial effects of the disclosure are as follows.

After selecting the automatic driving function to be tested and setting the parameters of the vehicle operation zone, the scenario generation range is formed. The coverage of the test scenario is improved by dividing the generated range and setting the freedom of early autonomous driving exploration. The efficiency of the test process is improved by continuously improving the probability of generating dangerous scenarios in the test process. Thus, it is ensured that the generated test scenarios take into account both test efficiency and test coverage.

BRIEF DESCRIPTION OF THE DRAWINGS

In order to explain the embodiments of the present disclosure or the technical solutions in the prior art more clearly, the following drawings that need to be used in the description of the embodiments or the prior art will be briefly introduced. It should be understood that the following drawings show only some embodiments of the present disclosure and should not be regarded as limiting the scope. For those of ordinary skill in the art, other drawings can be obtained based on the drawings disclosed without creative work.

DETAILED DESCRIPTION OF THE EMBODIMENTS

Technical solutions of the present disclosure will be clearly and completely described below with reference to the drawings in the embodiments. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

Figure 1:
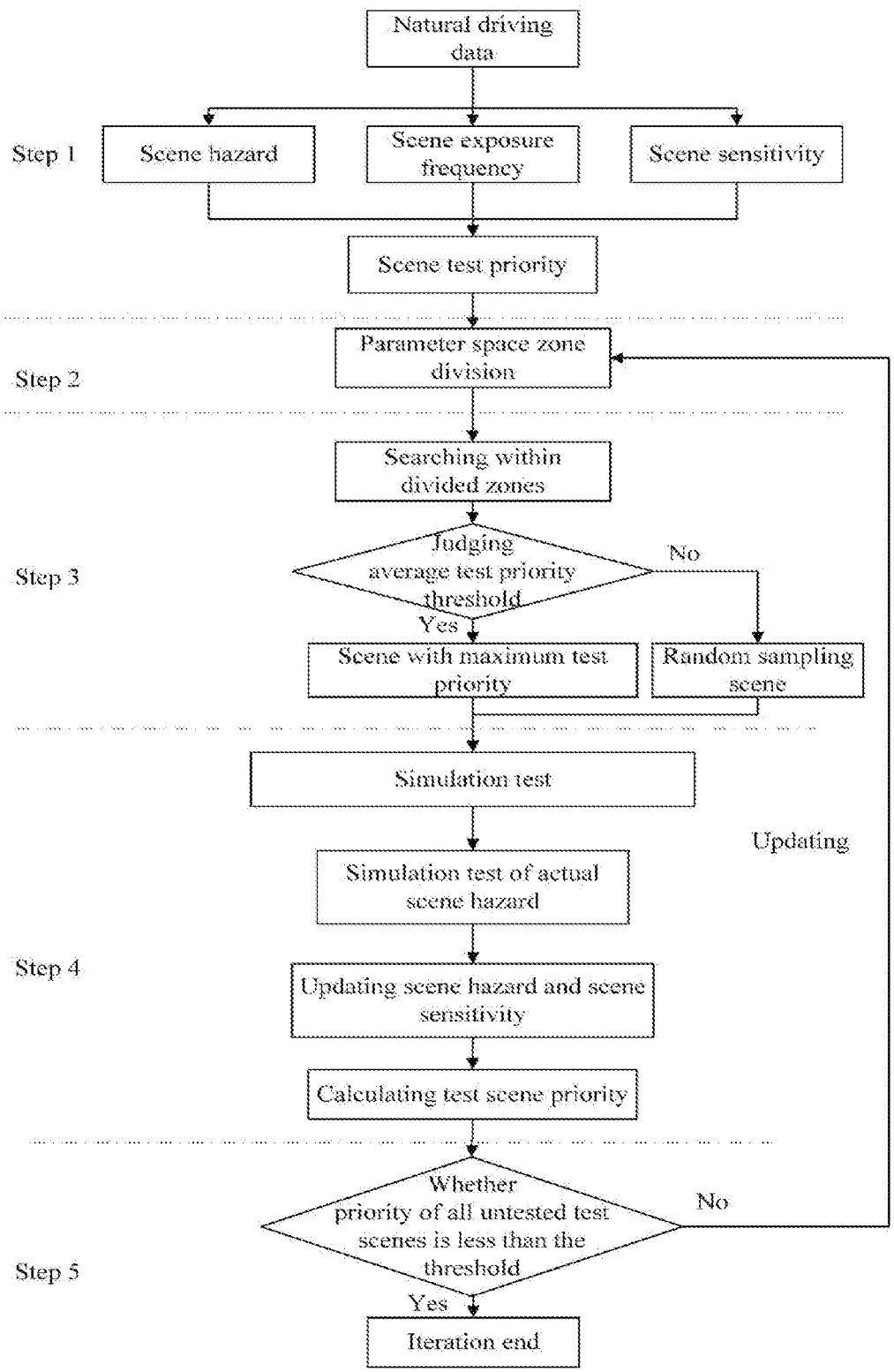
FIG. 1 is a flowchart of the present disclosure.

Referring to FIG. 1, the present disclosure provides an automatic driving acceleration test method considering efficiency and coverage, which includes the following steps.

Step 1: definition of scenario test priority.

scenario hazard, scenario exposure frequency and scenario sensitivity of different specific test scenarios are determined according to natural driving data, and then a test priority $w_i$ corresponding to a specific test scenario is calculated.

The specific method of the step 1 is as follows.

11) The scenario test priority is determined by the scenario hazard, scenario exposure frequency and scenario sensitivity of the test scenario.

12) The scenario hazard is divided based on a risk level during the test, and the scenario is divided into a collision scenario and a non-collision scenario. The collision scenario is subdivided into severe collision, general collision and minor collision according to a maximum acceleration of the collision process. The non-collision scenario is divided into close-collision and safety scenario according to a maximum $TTC^{-1}$ during the test, that is, a reciprocal of collision time. The definition of $TTC^{-1}$ is shown in formula (1). The hazard is normalized to define the scenario hazard $h_i$, wherein i is a specific scenario location, $h_i$ is 1.0 for the severe collision, $h_i$ is 0.8 for the general collision, $h_i$ is 0.6 for the minor collision, $h_i$ is 0.4 for the close-collision, and $h_i$ is 0.2 for the safety scenario. The magnitude of acceleration has a key impact on the degree of collision damage. The greater the maximum collision deceleration during collision, the more obvious the damage caused.

$$TTC^{-1} = \frac{\Delta v}{\Delta dis} \quad (1)$$

Wherein, Δdis is a vehicle spacing between the front and rear vehicles, and Δv is a relative speed between the front and rear two vehicles.

0.7 s$^{-1}$ is taken as a $TTC^{-1}$ boundary of the close-collision and the safety scenario, that is, for $TTC_{max}^{-1} \geq 0.7$, it is identified as the close-collision state, $h_i$=0.4; and for $TTC_{max}^{-1} < 0.7$, it is identified as the safety scenario, $h_i$=0.2.

13) The exposure frequency of the scenario is described by Gaussian model, as shown in formula (2).

$$p_i = \frac{1}{(2\pi)^{\frac{d}{2}} |\Sigma|^{\frac{1}{2}}} \exp\left[-\frac{1}{2}(X-\mu)^T \Sigma^{-1} (X-\mu)\right] \quad (2)$$

Wherein, d is a parameter dimension, Σ is a covariance matrix describing a correlation of various types of parameters, μ is a mean vector of each parameter variable, and X is a specific scenario parameter vector.

14) The scenario sensitivity refers to a collision uncertainty of the specific scenario, that is, dangerous zones and safety zones in the logical scenario parameter space are divided according to an existing database data. The closer a point is to a boundary of the dangerous space and safety space, the greater the collision uncertainty of this point, as shown in formula (3) and (4).

$$d_i = \sqrt{(x_1 - x'_1)^2 + (x_2 - x'_2)^2 + \cdots + (x_n - x'_n)^2} \quad (3)$$

$$U_{di} = \begin{cases} \dfrac{d_{out} - d_i}{d_{out}}, & i \notin safetyzone \quad d_i < d_{out} \\ \dfrac{d_{in} - d_i}{d_{in}}, & i \in safetyzone \quad d_i < d_{in} \\ 0.01, & others \end{cases} \quad (4)$$

Wherein, x is a calculated specific scenario parameter, x' is a closest point parameter between the dangerous boundary and the specific scenario parameter point, subscript n is a dimension of scenario elements, i is a location of the specific scenario, $U_{di}$ is the scenario sensitivity of the specific scenario, safetyzone is the safety zone space in the logical scenario parameter space, $d_i$ is a nearest distance between the specific scenario and the dangerous boundary.

Due to the large range gap between the collision zone and the safety zone, the distance between the two needs to be standardized. A length of Euclidean distance between two points composed of an upper limit and a lower limit of all dimensions in the parameter space is taken as a space length, the nearest distance $d_{out}$ between the boundary point of the parameter space in the collision zone and the boundary line is a standardized reference value of the collision zone, and the rest $d_{in}$ of the space length is the standardized reference value of the safety zone.

15) Combined with the obtained specific scenario hazard $h_i$, scenario exposure frequency $p_i$ and scenario sensitivity $U_{di}$, the concept of scenario test priority is proposed, which represents an importance weight of the specific scenario, that is, a value of testing the specific scenario. A calculation method of the scenario test priority is shown in formula (5).

$$w_i = U_{di} \cdot p_i \cdot h_i \quad (5)$$

Step 2: zone division.

A scenario generation range parameter space is divided according to the test priority $w_i$ of the specific test scenario, and the specific test scenarios with similar test priorities are divided together.

The specific method of step 2 is as follows.

The logical scenario parameter space is divided according to the test priority $w_i$ of the specific scenario.

21) Firstly, a specific scenario parameter position with the highest test priority in the parameter space is selected as a zone center of the first small zone.

22) Secondly, locations of the adjacent specific scenario parameters are explored in all directions around the specific scenario parameter point with the highest test priority, and the specific scenario with the highest test priority in the zone is divided into the first small zone.

23) Finally, the first small zone is taken as a new zone center and it is continued to explore surroundings of the first small zone.

After the end of each exploration in steps 22) and 23), an average test priority of all specific scenarios in the current zone is calculated. When the average test priority reaches a set threshold, the division ends, and it is necessary to reselect the scenario parameter position with the highest test priority from the remaining specific scenarios in the parameter space as a zone center of the next zone. In a late stage of zone division, because the test priority of the remaining specific scenarios in the parameter space is small, it is necessary to limit a maximum value of the number of scenarios in the zone, and the exploration should be stopped even if the average test priority does not reach the set threshold. In addition, a minimum value of the number of specific scenarios in the zone is set. When the parameter space cannot be further divided, missing specific scenario parameters that are located at the edge of the parameter space or do not meet the requirements of zone division are sorted out and assigned to an adjacent zone with a closest average test priority.

Step 3: search within zones.

Specific test scenarios are selected from all the divided zones in turn, then a set to be tested in this round is formed, and a tested autopilot algorithm is tested by the specific test scenarios in the set to be tested to obtain a result.

The specific method of step 3 is as follows.

31) When all the specific scenarios have found the zone to which they belong, the specific scenarios are selected from all the divided zones in turn to form the set to be tested in this round, and a black box autopilot algorithm is automatically tested by the specific scenarios in the set to be tested and the result is obtained, that is, the scenario hazard obtained by the test of the autopilot algorithm in the specific scenarios is obtained.

32) For the zone where a zone average test priority of the zone is greater than the specified threshold, the specific scenario parameters with the highest test priority and not participating in the test are selected for the test. For the zone where a zone average test priority is less than the threshold, the specific scenarios that do not participate in the test are randomly selected for the test. This search method can not only ensure that the specific scenarios with high search probability near the dangerous boundary can be fully tested to improve the test efficiency, but also ensure that certain exploration can be carried out in the whole parameter space to ensure the coverage of the test process.

Step 4: update of scenario test priorities.

Actual scenario hazards of the selected scenarios in each zone in the obtained test result are compared with scenario hazards at a location of the specific test scenario parameters obtained by the natural driving data, and the test priority of the specific test scenario corresponding to the tested algorithm in the scenario generation parameter space is updated.

The specific method of step 4 is as follows.

41) The actual scenario hazard of the selected scenarios in each zone in the test result obtained in the step 3 is compared with scenario hazard at the corresponding specific scenario parameter location in a prior data, and the specific scenario test priority corresponding to the tested algorithm in the scenario generation parameter space is updated.

If the scenario hazard in the test result is the same as the corresponding scenario hazard in the prior data, the test priority of the specific scenario corresponding to the tested algorithm will not change. If the test result is different from the prior data result, the scenario hazards and scenario sensitivities of the specific scenario and surrounding specific scenarios are changed according to formula (6) and (7), so that further the test priorities of the specific scenario and surrounding specific scenarios are changed. When updating the scenario hazard, if the actual scenario hazard obtained from the specific scenario test result is higher than the prior data, the initial $h_i$ is changed to the actual scenario hazard $h_{if}$ corresponding to the test result. On the contrary, a root mean square of the hazards of the test result and database data is taken as the updated scenario hazard $h'_i$, as shown in formula (6).

$$h'_i = \frac{\sqrt{h_{if}^2 + h_i^2}}{2} \quad (6)$$

The above formula can make the specific scenario and its set of scenarios maintain a high test priority. Although it increases the possibility of the set being searched repeatedly, it tends to the latter when the test efficiency and safety cannot be achieved at the same time, so as to ensure that all collision scenarios can be included.

42) When updating the sensitivity of specific scenario, a concept of sensitive field change is introduced, that is, after finding out the specific scenario location in this round of test result that are inconsistent with the database data, and the specific scenario location in this round of test result that are inconsistent with the database data is regarded as a center point of field change, and a formula causing the field change of surrounding points is:

$$U'_{dif\_k} = \begin{cases} \min\left[\frac{1}{2}\eta\left(\frac{1}{d(q_k, q_{dif\_n})} - \frac{1}{d^*}\right)^2, o\right], & d(q_k, q_{dif\_n}) \le d^* \\ 0, & d(q_k, q_{dif\_n}) > d^* \end{cases} \quad (7)$$

$$U_{dif} = \min\left(\sum U'_{dif}, o\right) \quad (8)$$

Wherein, $U_{dif}'$ is a field change value of the n-th change point received by the specific scenario at the point k, $U_{dif}$ is a field change value of all change points received at point k, $d(q_k, q_{dif\_n})$ is a distance between the point k and the n-th change point, $d^*$ is a distance influence threshold, $\eta$ is an adjustment parameter, and o is a set threshold.

This method focuses on the critical zones of collision and non-collision, that is, when the test result of the specific scenario and the scenario hazard of the database data belong to the two kinds of states of minor collision and close-collision respectively, the distance influence threshold and adjustment parameters of the two kinds of minor collision and close-collision are twice the changes of other types. It will cause more field changes in the surrounding scenarios and improve the test priority, and then make the search direction shift to the local zone.

After completing the calculation of the field changes at all locations, the updated test priority of the specific scenario is:

$$w_i' = \min[(U_{di} + U_{dif}) \cdot p_i \cdot h_i', X] \quad (9)$$

Wherein, $w_i'$ is the updated scenario test priority, and X is an upper limit of the set scenario test priority.

Step 5: iterative test.

The steps 2, 3 and 4 are repeated until the test priorities of all specific test scenarios remaining in the scenario generation range is lower than a set threshold.

The specific method of step 5 is as follows.

Steps 2, 3 and 4 are repeated until the test priority of the remaining test scenarios within the scenario generation range is lower than the set parameter threshold. And at this time, the iteration is terminated, and the test result is output for a subsequent performance evaluation of the tested autonomous vehicle.

Embodiment

Figure 2:
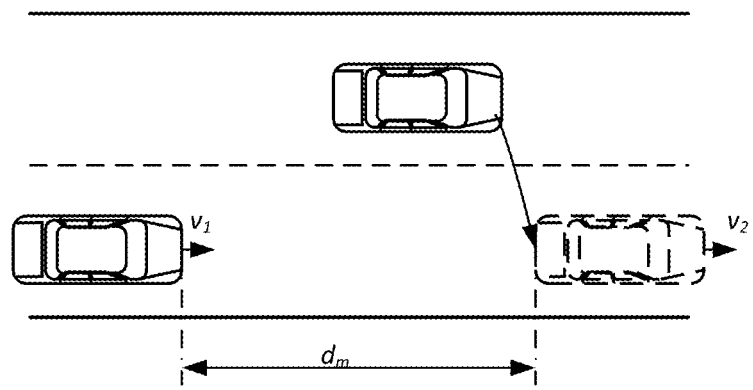
FIG. 2 is a schematic diagram of the test scenarios in the present disclosure.
Figure 3:
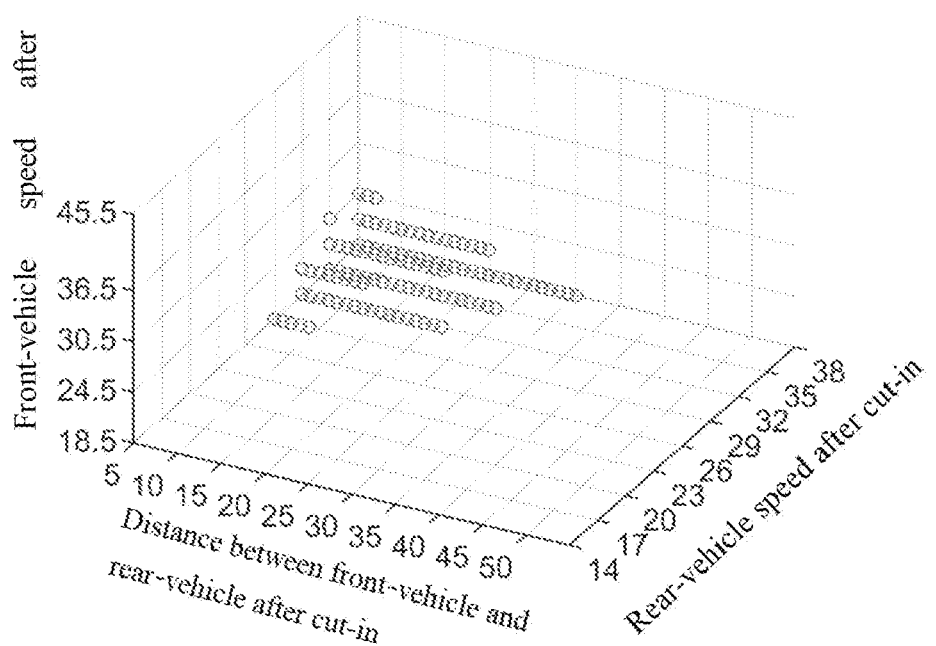
FIG. 3 shows the test result of the disclosure.

Referring to FIG. 2, the front-vehicle cut-in scenario was taken as the actual situation of the application of this method. The vehicle speed $v_1$ after cut-in, the distance $d_m$ between the front-vehicle and the vehicle after cut-in and the front-vehicle speed $v_2$ after cut-in were selected as the scenario parameters, and their parameter space ranges were [14 m/s, 38 m/s], [5 m, 55 m], [18.5 m/s, 45.5 m/s] respectively. The discrete step of speed was 3 m/s, and the discrete step of distance was 1 m. A total of 4590 specific scenario parameters were obtained, which together constituted the test scenario generation range. Using this method and the traversal test method to test and compare, both methods had found all dangerous scenarios, as shown in FIG. 3. The circle in FIG. 3 was the specific test scenario parameters of the measured method. This method tested 768 times, and the traversal test method tested 4590 times. This result proved that this method can effectively speed up the test process.

What is claimed is:

1. An automatic driving acceleration test method considering efficiency and coverage, comprising:
   Step 1: definition of scenario test priority;
   determining scenario hazard, scenario exposure frequency and scenario sensitivity of different specific test scenarios according to natural driving data, and then calculating a test priority $w_i$ corresponding to a specific test scenario;
   Step 2: zone division;
   dividing a scenario generation range parameter space according to the test priority $w_i$ of the specific test scenario, and dividing the specific test scenarios with similar test priorities together,
   Step 3: search within zones;
   selecting specific test scenarios from all the divided zones in turn, forming a set to be tested in this round, and testing a tested autopilot algorithm by the specific test scenarios in the set to be tested to obtain a result;
   Step 4: update of scenario test priorities;
   comparing actual scenario hazards of the selected scenarios in each zone in the obtained test result with scenario hazards at a location of the specific test scenario parameters obtained by the natural driving data, and updating the test priority of the specific test scenario corresponding to the tested algorithm in the scenario generation parameter space;
   Step 5: iterative test;
   repeating the steps 2, 3 and 4 until the test priorities of all specific test scenarios remaining in the scenario generation range is lower than a set threshold.

2. The automatic driving acceleration test method considering efficiency and coverage of claim 1, wherein a specific method of the step 1 is as follows:
   the scenario test priority is determined by the scenario hazard, scenario exposure frequency and scenario sensitivity of the test scenario;
   the scenario hazard is divided based on a risk level during the test, and the scenario is divided into a collision scenario and a non-collision scenario; the collision scenario is subdivided into severe collision, general collision and minor collision according to a maximum acceleration of the collision process; the non-collision scenario is divided into close-collision and safety scenario according to a maximum $TTC^{-1}$ during the test, that is, a reciprocal of collision time; a definition of $TTC^{-1}$ is shown in formula (1); the hazard is normalized to define the scenario hazard $h_i$, wherein i is a specific scenario location, $h_i$ is 1.0 for the severe collision, $h_i$ is 0.8 for the general collision, $h_i$ is 0.6 for the minor collision, $h_i$ is 0.4 for the close-collision, and $h_i$ is 0.2 for the safety scenario;

$$TTC^{-1} = \frac{\Delta v}{\Delta dis} \quad (1)$$

wherein, $\Delta dis$ is a vehicle spacing between the front and rear vehicles, and $\Delta v$ is a relative speed between the front and rear two vehicles;

$0.7\ s^{-1}$ is taken as a $TTC^{-1}$ boundary of the close-collision and the safety scenario, that is, for $TTC_{max}^{-1} \geq 0.7$, it is identified as the close-collision state, $h_i = 0.4$; and for $TTC_{max}^{-1} < 0.7$, it is identified as the safety scenario, $h_i = 0.2$;

the exposure frequency of the scenario is described by Gaussian model, as shown in formula (2)

$$p_i = \frac{1}{(2\pi)^{\frac{d}{2}} |\Sigma|^{\frac{1}{2}}} \exp\left[-\frac{1}{2}(X-\mu)^T \Sigma^{-1}(X-\mu)\right] \quad (2)$$

wherein, d is a parameter dimension; $\Sigma$ is a covariance matrix describing a correlation of various types of parameters; $\mu$ is a mean vector of each parameter variable; and X is a specific scenario parameter vector, the scenario sensitivity refers to a collision uncertainty of the specific scenario, that is, dangerous zones and safety zones in the logical scenario parameter space are divided according to an existing database data; the closer a point is to a boundary of the dangerous space and safety space, the greater the collision uncertainty of this point, as shown in formula (3) and (4)

$$d_i = \sqrt{(x_1 - x'_1)^2 + (x_2 - x'_2)^2 + \cdots + (x_n - x'_n)^2} \quad (3)$$

$$U_{di} = \begin{cases} \dfrac{d_{out} - d_i}{d_{out}}, & i \notin safetyzone \quad d_i < d_{out} \\ \dfrac{d_{in} - d_i}{d_{in}}, & i \in safetyzone \quad d_i < d_{in} \\ 0.01, & \text{others} \end{cases} \quad (4)$$

wherein, x is a calculated specific scenario parameter; x' is a closest point parameter between the dangerous boundary and the specific scenario parameter point; subscript n is a dimension of scenario elements; i is a location of the specific scenario; $U_{di}$ is the scenario sensitivity of the specific scenario; safetyzone is the safety zone space in the logical scenario parameter space; $d_i$ is a nearest distance between the specific scenario and the dangerous boundary, that is, the distance between x and x';

a length of Euclidean distance between two points composed of an upper limit and a lower limit of all dimensions in the parameter space is taken as a space length, the nearest distance $d_{out}$ between the boundary point of the parameter space in the collision zone and the boundary line is a standardized reference value of the collision zone, and the rest $d_{in}$ of the space length is the standardized reference value of the safety zone; combined with the obtained specific scenario hazard $h_i$, scenario exposure frequency $p_i$ and scenario sensitivity $U_{di}$, the concept of scenario test priority is proposed, which represents an importance weight of the specific scenario, that is, a value of testing the specific scenario; a calculation method of the scenario test priority is shown in formula (5):

$$w_i = U_{di} \cdot p_i \cdot h_i \quad (5).$$

3. The automatic driving acceleration test method considering efficiency and coverage of claim 1, wherein a specific method of step 2 is as follows:

firstly, a specific scenario parameter position with the highest test priority in the parameter space is selected as a zone center of the first small zone;

secondly, locations of the adjacent specific scenario parameters are explored in all directions around the specific scenario parameter point with the highest test priority, and the specific scenario with the highest test priority in the zone is divided into the first small zone;

finally, the first small zone is taken as a new zone center and it is continued to explore surroundings of the first small zone.

4. The automatic driving acceleration test method considering efficiency and coverage of claim 3, wherein after the end of each exploration in steps 22) and 23), an average test priority of all specific scenarios in the current zone is calculated; when the average test priority reaches a set threshold, the division ends, and it is necessary to reselect the scenario parameter position with the highest test priority from the remaining specific scenarios in the parameter space as a zone center of the next zone; in a late stage of zone division, because the test priority of the remaining specific scenarios in the parameter space is small, it is necessary to limit a maximum value of the number of scenarios in the zone, and the exploration should be stopped even if the average test priority does not reach the set threshold; in addition, a minimum value of the number of specific scenarios in the zone is set; when the parameter space cannot be further divided, missing specific scenario parameters that are located at the edge of the parameter space or do not meet the requirements of zone division are sorted out and assigned to an adjacent zone with a closest average test priority.

5. The automatic driving acceleration test method considering efficiency and coverage of claim 1, wherein a specific method of step 3 is as follows:

when all the specific scenarios have found the zone to which they belong, the specific scenarios are selected from all the divided zones in turn to form the set to be tested in this round, and a black box autopilot algorithm is automatically tested by the specific scenarios in the set to be tested and the result is obtained, that is, the scenario hazard obtained by the test of the autopilot algorithm in the specific scenarios is obtained;

for the zone where a zone average test priority of the zone is greater than the specified threshold, the specific scenario parameters with the highest test priority and not participating in the test are selected for the test; for the zone where a zone average test priority is less than the threshold, the specific scenarios that do not participate in the test are randomly selected for the test.

6. The automatic driving acceleration test method considering efficiency and coverage of claim 1, wherein a specific method of step 4 is as follows:

the actual scenario hazard of the selected scenarios in each zone in the test result obtained in the step 3 is compared with scenario hazard at the corresponding specific scenario parameter location in a prior data, and the specific scenario test priority corresponding to the tested algorithm in the scenario generation parameter space is updated;

if the scenario hazard in the test result is the same as the corresponding scenario hazard in the prior data, the test priority of the specific scenario corresponding to the tested algorithm will not change; if the test result is different from the prior data result, the scenario hazards and scenario sensitivities of the specific scenario and surrounding specific scenarios are changed according to formula (6) and (7), so that further the test priorities of the specific scenario and surrounding specific scenarios are changed; when updating the scenario hazard, if the actual scenario hazard obtained from the specific scenario test result is higher than the prior data, the initial $h_i$ is changed to the actual scenario hazard $h_{if}$ corresponding to the test result; on the contrary, a root mean square of the hazards of the test result and database data is taken as the updated scenario hazard $h'_i$, as shown in formula (6):

$$h'_i = \frac{\sqrt{h_{if}^2 + h_i^2}}{2} \quad (6)$$

when updating the sensitivity of specific scenario, a concept of sensitive field change is introduced, that is, after finding out the specific scenario location in this round of test result that are inconsistent with the database data, and the specific scenario location in this round of test result that are inconsistent with the database data is regarded as a center point of field change, and a formula causing the field change of surrounding points is:

$$U'_{dif\_k} = \begin{cases} \min\left[\frac{1}{2}\eta\left(\frac{1}{d(q_k, q_{dif\_n})} - \frac{1}{d^*}\right)^2, o\right], & d(q_k, q_{dif\_n}) \le d^* \\ 0, & d(q_k, q_{dif\_n}) > d^* \end{cases} \quad (7)$$

-continued $$U_{dif} = \min\left(\sum U'_{dif}, o\right) \quad (8)$$

wherein, $U_{dif}'$ is a field change value of the n-th change point received by the specific scenario at the point k, $U_{dif}$ is a field change value of all change points received at point k; $d(q_k, q_{dif\_n})$ is a distance between the point k and the n-th change point; $d^*$ is a distance influence threshold; $\eta$ is an adjustment parameter; and o is a set threshold;

when the test result of the specific scenario and the scenario hazard of the database data belong to the two kinds of states of minor collision and close-collision respectively, the distance influence threshold and adjustment parameters of the two kinds of minor collision and close-collision are twice the changes of other types;

after completing the calculation of the field changes at all locations, the updated test priority of the specific scenario is:

$$w_i' = \min[(U_{dif} + U_{dif}) \cdot p_i \cdot h_i', X] \quad (9)$$

wherein, $w_i'$ is the updated scenario test priority, and X is an upper limit of the set scenario test priority.

7. The automatic driving acceleration test method considering efficiency and coverage of claim 1, wherein a specific method of step 5 is as follows:

steps 2, 3 and 4 are repeated until the test priority of the remaining test scenarios within the scenario generation range is lower than the set parameter threshold; and at this time, the iteration is terminated, and the test result is output for a subsequent performance evaluation of the tested autonomous vehicle.

* * * * *